United States Patent Office 3,575,885
Patented Apr. 20, 1971

3,575,885
SUPPORTED CUPROUS HALIDE ABSORBENTS AND METHODS FOR THEIR PREPARATION
Edward Allen Hunter, Lake Jackson, Tex., and Marnell Albin Segura and William Lambert Senn, Jr., Baton Rouge, La., assignors to Esso Research and Engineering Company
No Drawing. Filed Mar. 1, 1965, Ser. No. 436,375
Int. Cl. B01j 11/24
U.S. Cl. 252—429            17 Claims

ABSTRACT OF THE DISCLOSURE

Supported active cuprous halide sorbents are prepared by contacting a cuprous halide solution with a porous, particulate support, such as silica and/or alumina to impregnate the cuprous halide therein, then contacting the impregnated support with a suitable ligand, such as butadiene, to form an insoluble complex within the pores of the support, and activating the sorbent by decomplexing the complex.

---

This invention is directed to the preparation of active cuprous halide sorbents having improved fluidization properties, and greatly improved sorptive capacity over extended periods of use covering repeated sorption-desorption cycles in a given olefin separation and recovery process, esp. those involving sorbents employed in fluidized beds.

More specifically, the present invention is directed to preparation of improved cuprous halide active sorbents possessing the above and other desirable properties by impregnating a porous, inorganic, particulate support with a solution of cuprous halide, precipitating an insoluble cuprous halide-ligand complex in situ within the pores of said support, and then decomplexing said cuprous chloride-ligand complex in situ to yield a readily-fluidizable, supported cuprous halide active sorbent of enhanced fluidization properties, and especially good ruggedness in maintenance of sorptive capacity over extended periods of use thus making better utilization of active cuprous halide sorbent than occurs with unsupported active cuprous halide sorbent particles. The latter feature is especially important since it results in longer "on process" time for the supported cuprous chloride sorbent before it needs replacement.

According to a preferred embodiment of this invention the cuprous halide sorbent (formed within the pores of the support) is deposited therein with a plurality of impregnation steps. Each impregnation step involves precipitation of the insoluble cuprous halide-ligand complex and activation thereof in situ (within the pores of the support), and increases the amount of active sorbent present within the pores of the porous support. The initial impregnation is conducted by impregnating the support with a solution of cuprous halide salt, then contacting the thus impregnated support with the complexing compound (preferably in liquid form) to precipitate the solid (insoluble) complex within the pores of the support. Following this the supported complex is heated to effect decomplexation (activation) thereof thus yielding the initially deposited active cuprous halide sorbent formed in and supported by the support. Subsequently deposited active cuprous halide sorbent particles are formed by subsequent impregnations preferably performed in the same sequential manner. These subsequent impregnations are preferably conducted using substantially saturated cuprous halide solutions, viz., cuprous halide solutions containing dissolved therein substantially as much cuprous halide salt as a given suitable solvent will dissolve and maintain in solution throughout the impregnation step at the impregnation temperatures employed. Usually the cuprous halide solutions employed to conduct the subsequent impregnations contain sufficient dissolved cuprous halide salt to attain 80+ percent of maximum saturation attainable at the temperatures of impregnation with a given suitable solvent. We have discovered that by conducting the subsequent impregnations in this way, leaching of previously deposited active cuprous halide sorbent can be avoided or minimized during the subsequent impregnation step(s). While the initial cuprous halide solution used to conduct the initial impregnation step can contain concentrations of cuprous halide well below saturation, it is preferred that the initial impregnation step also be done using a substantially saturated cuprous halide solution.

According to another but less preferred embodiment of this invention the active sorbent can be deposited, viz, the complex precipitated and activated, within the pores of the support using a single precipitation step. One such alternate procedure involves conducting but one impregnation sequence (single impregnation with cuprous halide solution followed by in situ complexation (precipitation) followed by in situ activation) to deposit all of the active sorbent within the pores of the porous support. Another alternate procedure involves repeated impregnations of the support with cuprous halide solutions (with the support being dried between each such impregnation) followed by introduction of all of the complexing compound in a single in situ precipitation step followed by in situ activation to deposit all of the active sorbent within the pores of the porous support. Both of these alternate less preferred procedures involve a single precipitation step.

In all of the embodiments of this invention, however, the complex is precipitated and decomplexed within the pores of the porous support as this is an essential feature of the present invention.

The particulate material which serves as the support for the impregnated cuprous halide sorbent has the following characteristics: (1) It is inorganic and contains either silica or alumina or both. (2) The support has a low surface area, e.g., below about 350 sq. meters/gram. (3) The inorganic particulate support has a high pore volume of at least 1 cubic centimeter per gram, and more preferably 1.5+ cubic cms. per gram. (4) The inorganic support material has pores having an average pore diameter of greater than 100 A. but less than about 10,000 A., usually greater than 200 A. but less than 8000 A. and more preferably from about 220 to 900 A. (5) The predominant component of the support on a weight basis has a particle size (particle diameter) ranging from 30 to 200 microns; usually 50+ wt. percent of the particles range between 50 to 200 microns in size, and more preferably 70+ wt. percent of the inorganic support particles have a particle size ranging from 50 to 200 microns.

Suitable classes of support materials which can be employed in accordance with this invention provided that they have the five abovementioned characteristics include, but are not limited to, the following: silica gels; silica microspheres; alumina gels; silica-alumina mixtures, gels and microspheres; kieselguhr clays, and other diatomaceous skeletal deposits.

In accordance with the present invention, a cuprous halide salt is dissolved in a suitable solvent at temperatures ranging from about −50 to about +50° F. with agitation to dissolve the cuprous halide salt therein. Following formation of the cuprous halide solution, the solution is clarified by removal of undissolved salts and other insoluble residues therefrom. This can be accomplished readily by filtration using conventional glass fiber or other suitable filters customarily employed to remove solids from liquids. Alternatively, the cuprous halide solution can be decanted from the insolubles. The particulate support, having the characteristics set forth hereinabove, is then chilled to the temperature of the cuprous halide solution, and added slowly to the clarified cuprous halide salt solution. The system is equilibrated for from several minutes to several hours, and the cuprous halide impregnated particulate support solids are separated from the liquid. When an organic hydrocarbon, e.g. a $C_4$ to $C_9$ monoolefin, is used as the solvent to dissolve the cuprous halide salt, the solids containing the cuprous halide solution impregnated therein can then be washed with a liquid $C_4$ to $C_9$ olefinic hydrocarbon at the temperatures employed for impregnation (minus 50 to 50° F.). This washing usually is conducted over a very brief period of time, viz., one to five minutes normally, and removes solid cuprous chlorides from the exterior surface of the supporting particles. This washing step is optional and can be omitted.

The solid particulate support containing the cuprous chloride solution impregnated therein is then complexed by slowly adding the impregnated particles to a $C_4$ to $C_9$ monoolefinic solvent containing solution of liquid butadiene, or other suitable complexing ligand. This slurry is then equilibrated over a time period ranging from 30 minutes to several hours to form the insoluble cuprous halide-ligand complex in situ within the pores of the porous support. The complex can then be activated (decomplexed) to form the active cuprous halide sorbent in situ within the pores of the inorganic particulate support by gently heating in vacuo the particulate support containing the cuprous halide-ligand complex. The activation temperatures can range from about 60 to about 200° F., usually range from about 100 to 180° F., and preferably range from about 120 to 160° F.

As an alternate procedure to impregnating the said inorganic particulate support first with the cuprous halide solution, the inorganic support can be first impregnated with the liquid complexing agent (e.g. butadiene) containing solution and then impregnated with the cuprous halide solution. However, the preferred sequential impregnation procedure in accordance with this invention, is to first impregnate the inorganic particulate support with the carified cuprous halide solution followed by contact thereof with the complexing ligand containing solution.

The cuprous halide salts which can be employed herein include cuprous chloride, cuprous bromide, and cuprous iodide with cuprous chloride being preferred. Generally, it is advisable to use a cuprous halide salt having a purity of 90+%, i.e., a cuprous halide salt which has a cuprous halide concentration of 90+%; but cuprous halide salts having lower purities can be tolerated. Usually, the cuprous halide salt purity ranges from 95 to 100%, and preferably from 99 to 100%. The cuprous halide should be fairly dry, i.e., contain less than about 1.0 wt. percent moisture. Generally, its moisture content should not exceed 0.5 wt. percent, and more usually not exceed about 0.3 wt. percent and preferably not exceed about 0.1 wt. percent.

Any solvent capable of readily dissolving cuprous halide salts and in which the cuprous halide-ligand complex is insoluble can be employed. Usually, the solvent will be a hydrocarbon solvent, e.g., a $C_4$ to $C_9$ olefin, or mixture of $C_4$ to $C_9$ olefins. Specific olefins which can be employed include, but are not limited to, the following: isobutylene, butene-1, pentene-1, hexene-1, octene-1, nonene-1, etc. The preferred hydrocarbon solvents for dissolving the cuprous halide salts are the $C_4$ to $C_9$ alpha mono olefins, but internal straight chain monoolefins can be used, e.g., butene-2.

While the abovementioned solvents are organic, it is also possible to use aqueous acid solvents, e.g. aqueous solutions of hydrochloric acid although these are less preferred solvents. When aqueous HCl is used as the cuprous halide solvent, the impregnated support is usually washed with ether to remove water therefrom after each impregnation with cuprous halide solution prior to each contact of the complexing compound therewith.

As mentioned above, the cuprous halide salt is added to the hydrocarbon solvent while the solvent is maintained at temperatures ranging from about $-50$ to $50°$ F. Usually the hydrocarbon solvent or solvent mixture is maintained at temperatures of $-20$ to $+20°$ F. and more preferably ranging from $-10$ to $+10°$ F., while the cuprous halide salt is added thereto. Agitation of the mixture aids in dissolving the cuprous salt therein, and hence the mixture is usually stirred during the formation of the cuprous halide solution. The concentration of cuprous halide salt dissolved in the hydrocarbon solvent in accordance with this invention can range from about 3 to 60 wt. percent, usually ranges from 25 to 55 wt. percent and preferably ranges from 35 to 55% by weight (based on total solution).

Suitable complexing agents (ligands) which can be employed in accordance with the invention to effect in situ complexing (precipitation) of the cuprous halide within the pores of the inorganic particulate support are those which form stable copper complexes having a mole ratio of copper to complexing compound greater than 1:1, and preferably 2:1 or higher. Such materials include both compounds which form only complexes having said ratios of copper to complexing compounds greater than 1:1, and compounds which form complexes having a ratio of 1:1 or less, which upon decomplexing pass through a stable complex having a ratio of copper to complexing compound greater than 1:1. Thus, certain materials, e.g., nitriles, diolefins, acetylenes, carbon monoxide, etc., under ordinary conditions forming a 2:1 complex can be made to complex in mole ratios of copper to complexing compound of 1:1 or less. However, upon dissociation complexing material is released selectively from the bed of supported cuprous halide until the stable complex, viz., the complex having a copper to complexing moiety ratio of above 1:1, e.g., 2:1 stoichiometric complex, is completely formed before further decomplexing to the uncomplexed (active) supported cuprous halide sorbent occurs. In this specification, by "stable complex" is meant a stoichiometric complex stable upon dissociation as described in the preceding sentence. In addition, the complexing ligand can contain other functional groups (other than the functional group complexing with the cuprous halide salt) so long as they do not interfere with complex formation. Suitable complexing agents which can be employed in accordance with this invention to form cuprous halide complexes which are at least partially insoluble in the solvent used to dissolve the cuprous halide salt include, but are not limited to, the following: $C_3$ to $C_{10}$ conjugated and nonconjugated, aliphatic and alicyclic polyolefins, e.g., butadiene-1,3, isoprene, piperylene, allene, cyclohexadiene, octadienes, cyclooctadienes, cyclooctatetraene, cyclododecatriene; $C_2$ to $C_{10}$ aliphatic, alicyclic and aromatic acetylenes and acetylenes containing additional unsaturation, e.g., acetylene, methylacetylene, propylacetylenes, phenylacetylenes, vinylacetylene, etc.; $C_2$ to $C_{10}$ and higher saturated and unsaturated, aliphatic, cyclic, and aromatic nitriles, e.g., acetonitrile, acrylonitrile, propiononitrile, phenylnitrile, methacrylonitrile, ethacrylonitrile, etc. The preferred organic complexing agent is butadiene. It is also within the purview of this invention to employ fluid (gaseous or liquid streams) containing the above mentioned complexing compounds diluted with an inert vehicle (gas or liquid) or natural petroleum streams, e.g., butadiene diluted with butenes and butanes, butadiene diluted with nitrogen, methane, etc. Any of these diluted streams containing the above mentioned complexing agents can be used so long as the diluent(s) do not adversely effect the formation and precipitation of the desired cuprous halide complex in situ within the pores of the particulate inorganic support material.

When employing butadiene as the complexing agent, the complexing is usually conducted at temperatures ranging from about −40 to 60° F., and more preferably at temperatures ranging from about −15 to 15° F., preferably using liquid butadiene by adding the cuprous halide impregnated particulate inorganic support (preferably gradually) to liquid butadiene present in a $C_4$ to $C_9$ mono olefinic solution thereof. The complex then forms in situ as an insoluble deposit within the pores of the inorganic particulate support material.

Then the active cuprous halide supported sorbent is prepared in situ from the in situ complexed cuprous halide-ligand complex by heating the latter at temperatures ranging from about 60 to 200° F., usually 100 to 180° F., and preferably 120 to 160° F. As noted hereinabove, it is preferable to employ plurality of impregnation (precipitation and activation) steps to deposit the active cuprous halide sorbent.

The supported cuprous halide sorbent particles formed and activated within the pores of the particulate inorganic support have the following characteristics: (1) The particulate supported sorbent has a surface area of less than 150 $m.^2/g.$; (2) the supported sorbent displays excellent fluidization characteristics (particles do not stick together, particles move well in the fluidized bed, and the gas distributes evenly amongst the particles); (3) the composite supported sorbents have a cuprous halide content of at least about 30% by weight, based on the total of support plus impregnated cuprous halide; and usually the cuprous halide content of the supported sorbent lies within the range of about 30 to 90 wt. percent; (4) the active cuprous halide sorbent particles formed and activated in situ within the pores of the inorganic particulate support have a smaller average crystallite size than unsupported active cuprous halide sorbent particles. The average crystallite size range of the active cuprous halide particles formed within the pores of the porous supports in accordance with this invention range from about 350 to 650 A. as determined by X-ray diffraction. Usually the average crystallite size of the supported sorbent particles lies within the range of 400 to 600 A. In contrast therewith unsupported active cuprous halide particles usually have an average crystallite size ranging from 700 A. upwards as determined by the same X-ray diffraction techniques. It has been observed that as crystallite size increases, the rate of sorption-desorption decreases. Hence it is more desirable to be able to use active cuprous halide sorbents containing crystallites of smaller average crystallite size; (5) the active cuprous halide, esp. cuprous chloride, sorbent particles (formed and activated in situ within the pores of the inorganic particulate support) are porous themselves and have a porosity of at least 10% (of the total volume of a particle) 550 to 10,000 A. pores as determined by mercury porosimeter measurements; (6) the predominant particles particle size component on a weight basis of the composite supported sorbents ranges in size from about 30 to 200 microns usually with 50+ wt. percent of the supported sorbent particles ranging from 50 to 200 microns and more preferably 70+ wt. percent within this size range; and (7) the supported cuprous halide sorbent particles have an initial (fresh) sorptive capacity for butadiene sorption of at least about 30% of theoretical (based on the cuprous chloride content), usually 50+% of theoretical and more preferably 60+% of theoretical, the major portion of said sorptive capacity being maintained over extended periods of use involving repeated sorption-desorption cycles.

In accordance with this invention, it has been observed that these supported activated cuprous halide sorbents prepared in accordance with this invention can remove essentially all, e.g., 95+% and more, of the butadiene present in hydrocarbon streams containing butadiene in concentrations ranging as low as about 15 wt. percent (based upon total hydrocarbon stream) and below. Of course, these supported cuprous halide sorbents likewise can be employed to selectively sorb and therefore remove butadiene and other complexing ligands from hydrocarbon streams containing less than 15 wt. percent or in excess of 80 wt. percent thereof. Moreover, these supported, active cuprous halide sorbents can be used to sorb other compounds containing ligands capable of complexing therewith, e.g., ammonia; carbon monoxide; HCN; $C_2$ to $C_{20}$ monoolefins, e.g. ethylene; $C_3$ to $C_{20}$ diolefins, e.g. allene; $C_4$ to $C_{20}$ conjugated diolefins, e.g. isoprene, etc.; or other ligand-containing compounds from mixtures containing them.

The olefin recovery (desorption) procedure, whereby the selectively sorbed olefin is removed from the supported cuprous halide sorbent particles, can be conducted conveniently in accordance with the conventional procedures, for example, as follows: The supported, complexed cuprous halide sorbent is stripped free of enclosed gases, preferably employing a portion of the olefin being recovered as a stripping gas, at temperatures ranging from about 100–150° F., although lower or higher temperatures can be used. The loaded and stripped supported sorbent is subjected during the desorption step to conditions of temperature and pressure such that the dissociation pressure of the complex which has been sorbed on the coated cuprous halide sorbent exceeds the partial pressure of the sorbed olefin. Consequently, the complex decomposes with release of the sorbed olefin, which is then recovered by conventional means.

The invention will be illustrated in greater detail in the following examples:

EXAMPLE 1

A butene-1 solution of cuprous chloride was prepared at approximately 0° F. by slow addition of cuprous chloride salt (95+% purity) into a previously chilled butene-1 solvent. Sufficient cuprous chloride was dissolved in butene-1 to prepare a 50 wt. percent cuprous chloride solution. This cuprous chloride solution was then clarified by filtering insolubles therefrom. The clarified solution was then impregnated into various supports, which were dried (dehydrated) by heating to remove moisture followed by storage in a dry atmosphere containing a desiccant material. One support was silica gel (chiefly $SiO_2$); another support was "Nalcat" microspheres (of a silica-alumina mixture containing 76.7 wt. percent silica and 23.0 wt. percent alumina) having a surface area of 275 $m.^2/g.$, a pore volume of 1.95 cc./g. and an average pore diameter of 284 A. The third inorganic particulate support was "Embacel" kieselguhr (a kieselguhr that had been flux calcined and was composed primarily by 90.6 wt. percent silica, 4.4 wt. percent alumina and 1.6 wt. percent iron oxide) having a surface area of approximately 1 (one) $m.^2/g.$, a pore volume of 2.7 cc./g. and an average pore diameter of approximately 8000 A. The supports were chilled to approximately 0° F. and added slowly to the clarified cuprous chloride solution also maintained at about 0° F. Then the respective systems were equilibrated for 60 minutes, and the solids separated therefrom. The solids comprised the inorganic particulate supports impregnated with the cuprous chloride solution. The solids were then washed from 1 to 5 minute periods with liquid isobutylene at 0° F. This washing essentially removed solid cuprous chloride from the surface of the inorganic particulate support particles.

Then, the impregnated support particles were slowly added to an isobutylene solution of liquid 1,3-butadiene precooled to ~0° F. This solution contained 35 wt. percent butadiene, the remainder being the solvent isobutylene. The insoluble cuprous chloride-butadiene complex was formed in situ within the pores of the inorganic support particles. Following this, the solids (containing the cuprous chloride-butadiene complex) were allowed to equilibrate in the liquid. Then, the solids were removed from the liquid and decomplexed by heating at temperatures of 135 to 145° F. in vacuo (625 millimeters of mercury vacuum) to form the active cuprous chloride sorbent within the pores of the inorganic supporting particles. The cuprous halide sorbents formed in all cases displayed excellent fluidization properties, sorptive capacity, selectivity for removal of butadiene from butadiene containing streams, and little or no tendency to stick or bridge in the fluidized bed (as gleaned from testing in fluidized beds).

EXAMPLE 2

The support used in this example was Nalco high pore volume (approximately 1.9 cu. cm. per gram) cracking catalyst "Nalcat" microspheres having the same composition as noted in Example 1. The microspheres were dried at 1000° F. in air for 16 hours to remove moisture therefrom, and stored under vacuum in a desiccator prior to impregnation with the cuprous chloride solution. A cuprous chloride solution was found by gradual addition of cuprous chloride salt to a pentene-1 solvent previously chilled to about 0° F. The dried microsphere support particles were also chilled to 0° F. prior to their addition to the cuprous chloride solution. The chilled microspheres were then added, while stirring, to the pentene-1 solution of cuprous chloride (this solution contained 37 wt. percent cuprous chloride salt dissolved therein). The excess liquor remaining in the reactor was taken off after allowing the system to equilibrate for a period of about 1 hour. Liquid butadiene was then added to the system, and the resulting slurry stirred in order to assist equilibration. The resulting impregnated microspheres were then removed from the liquid and the cuprous chloride-butadiene complex formed within the pores thereof was activated (decomplexed) by heating at a temperature of 140° F. for approximately 16 hours. The resulting supported cuprous chloride active sorbent was elutriated in a fluidized bed using nitrogen as a fluidizing gas at ambient temperatures (60 to 80° F.) to remove fine particles therefrom, i.e., particles having a size of less than about 40 microns. Any large agglomerates of these supported sorbents were sieved out, viz, particles having a particle size greater than about 200 microns. The same impregnation procedure was repeated four times with samples of the supported cuprous chloride sorbent being taken after the first, second, third and fourth impregnations. Each impregnation step took about two to three hours and included the sequential steps of first impregnating the support with the cuprous chloride solution followed by complexing and then decomplexing. The percent cuprous chloride deposited after each impregnation was noted along with the surface area of the supported sorbent and the sorptive capacity of the sorbent from each impregnation step for selectively sorbing butadiene from a butadiene-containing stream (a $C_4$ hydrocarbon stream containing approximately 35 wt. percent butadiene). The pertinent data resulting from these tests are summarized hereinbelow in Table I. Table I includes selectivity data indicating the wt. percent of butadiene contained in the $C_4$ hydrocarbon feed from which it was selectively removed. Table I also indicates (in Section B) the selectivity in removing butadiene obtained by the supported sorbents after first, second, third, and fourth impregnations. Cycle data are given in Section 3 of Table I indicating the total fluidization time to which the supported sorbents prepared after the third and fourth impregnation steps, respectively, were subjected along the number of cycles and the sorptive capacity of the sorbent as freshly prepared and after the given number of cycles. The initial attrition resistance of the supported active cuprous chloride sorbents prepared from three and four impregnations, respectively, as determined by data from cyclic units was found to be 0.2% fines lost per hour. This means that 0.2 wt. percent of the total supported sorbent was lost per hour when the supported sorbent was fluidized (using $C_4$ feed and $N_2$ as the fluidizing gases) and cycled between 35° F. and 170° F. over a 24-hour fluidization period due to elutriation of fines from the main portions of the fluidized bed. These fines essentially were blown off by the fluidization gas, and were not of sufficient size to remain in the fluidized bed.

TABLE I

Section 1, impregnation and capacity

| Sorbent after— | Weight percent CuCl on support | Surface area of support, m²/grams | Fresh sorptive capacity [1] |
|---|---|---|---|
| 1st. Impregnation | 47.1 | 115 | 42.0 |
| 2nd. Impregnation | 65.5 | 81 | 60.0 |
| 3rd. Impregnation | 74.8 | 62 | 68.0 |
| 4th. Impregnation | 79.7 | 53 | 62.7 |

Section 2, selectivity for butadiene sorption

| Component | Feed composition, weight percent | Composition of desorbate stream obtained from supported sorbent after impregnation no., weight percent based on total desorbate | | | |
|---|---|---|---|---|---|
| | | 1 | 2 | 3 | 4 |
| Lighter than n-$C_4H_{10}$ | 0.40 | 0.09 | 0.11 | ........ | 0.01 |
| n-$C_4H_{10}$ | 0.88 | 0.01 | 0.03 | ........ | 0.91 |
| Isobutylene plus butene-1 | 47.91 | 3.38 | 3.85 | 0.41 | 1.51 |
| Trans butene-2 | 8.86 | 0.68 | 0.86 | 0.03 | 0.15 |
| Cis butene-2 | 4.91 | 0.70 | 0.73 | 0.06 | 0.10 |
| 1,3-butadiene | 35.02 | 95.10 | 94.37 | 99.49 | 98.21 |
| Heavier [2] | 2.01 | 0.04 | 0.04 | 0.01 | 0.01 |

Cycle data

| Sorbent after— | Total fluidization time used, hours | Number of sorption-desorption cycles | Sorptive capacity for butadiene, based on CuCl content, percent of theoretical | |
|---|---|---|---|---|
| | | | Freshly prepared | After— No. of cycles |
| 3rd. Impregnation | 28 | 7 | 68.0 | 84.5 |
| 4th. Impregnation | 49 | 6 | 62.7 | 61.0 |

[1] For butadiene, percent of theoretical based on CuCl content.
[2] "Heavier" means those components having longer retention times on the gas chromatographic traces than the components listed.

EXAMPLE 3

An "Embacel" kieselguhr particulate inorganic support having a high pore volume (approximately 2.8 cc. per gram) and the same composition as set forth in Example 1 was subjected to two impregnations in accordance with the procedure of Example 2. The wt. percent cuprous chloride sorbent deposited within the porous kieselguhr support, the capacity of the supported cuprous chloride activated sorbents for sorption of butadiene, and the selectivity with which the butadiene was removed from a $C_4$ hydrocarbon stream containing approximately 35 wt. percent butadiene is noted in Table II below.

TABLE II

| Embacel kieselguhr support after— | Weight percent CuCl deposited | Sorptive capacity for butadiene [1] |
|---|---|---|
| 2nd. impregnation | 64.2 | 79.5 |

Selectivity data

| Component | Feed composition, weight percent | Composition of desorbate stream [2] |
|---|---|---|
| Lighter than n-$C_4H_{10}$ | 0.40 | 0.003 |
| n-$C_4H_{10}$ | 0.88 | 0.008 |
| Isobutylene plus butene-1 | 47.91 | 0.692 |
| Trans butene-2 | 8.86 | 0.102 |
| Cis butene-2 | 4.91 | 0.083 |
| 1,3-butadiene | 35.02 | 99.051 |
| Heavier | 2.01 | 0.061 |

[1] Percent of theoretical, based on CuCl content.
[2] Obtained from kieselguhr supported CuCl sorbent, after two impregnations weight percent of total desorbates.

EXAMPLE 4

A Davison silica gel (chiefly $SiO_2$) having a surface area of 309 sq. meters per gram and a pore volume of 1.73 cu. cm. per gram was impregnated with cuprous chloride according to the procedure of Example 2. Three impregnations were placed upon the silica gel support. After the third impregnation, the supported cuprous chloride sorbent contained 71.7 wt. percent cuprous chloride and had a sorptive capacity for butadiene based on the cuprous chloride content of 69.5% (percent of theoretical) based on CuCl content. This supported sorbent was then employed to selectively remove butadiene from the same feed stream as employed in Examples 2 and 3. The composition of the desorbate stream was as follows:

COMPOSITION OF DESORBATE STREAM (WT. PERCENT OF TOTAL DESORBATE)

| Component: | Desorbate (wt. percent) |
|---|---|
| Lighter than n-$C_4H_{10}$ | 0.02 |
| n-$C_4H_{10}$ | 0.01 |
| Isobutylene plus butene-1 | 1.44 |
| Trans butene-2 | 0.36 |
| Cis butene-2 | 0.31 |
| 1,3-butadiene | 97.80 |
| Heavier | 0.06 |

EXAMPLE 5

The Nalco cracking catalyst "Nalcat" microspheres of Example 1 were impregnated twice using the procedure according to Example 2. After the second impregnation stage, the "Nalcat" microspheres contained 67 wt. percent cuprous chloride, and the supported sorbent particles had a surface area of 98.0 m.²/gm. The sorptive capacity for butadiene removal of the freshly prepared cuprous chloride supported sorbent particles was 72.2% (percent of theoretical based on cuprous chloride content of supported activated sorbent). This sorbent was then employed to selectively sorb butadiene from the $C_4$ hydrocarbon feed stream the composition of which is indicated hereinabove in Examples 2 and 3. The desorbate stream obtained had the following composition:

| Component: | Composition of desorbate (wt. percent based on total desorbate) |
|---|---|
| Lighter than n-$C_4H_{10}$ | 0.13 |
| n-$C_4H_{10}$ | 0.01 |
| Isobutylene plus butene-1 | 1.30 |
| Trans butene-2 | 0.26 |
| Cis butene-2 | 0.29 |
| 1,3-butadiene | 97.98 |
| Heavier | 0.03 |

The above prepared supported cuprous chloride sorbent particles were tested for attrition resistance using the standard "Roller B" attrition resistance test, and were found to have an attrition resistance of 0.3% fines lost per hour. The above prepared supported cuprous chloride sorbent was employed in a fluidized bed for 24 hours over repeated sorption-desorption cycles without significant loss of sorptive capacity. At the end of 24 hours, the on unit rate of fines production was less than 1% fines per day.

EXAMPLE 6

A comparative test was conducted using unsupported cuprous chloride active sorbent particles (94.3 wt. percent of the particles having a particle size ranging from 50 to 110+ microns) versus supported active cuprous chloride sorbent having 88.9 wt. percent of the supported sorbent particles (supported on "Nalcat" microspheres) with a particle size ranging from 50 to 120 microns. The unsupported and supported active cuprous chloride sorbents were employed in a fluidized bed for over 100 hours using at least 50 sorption-desorption cycles (an average of 2 hours per sorption/desorption cycle). The initial sorptive capacity for butadiene removal as well as the sorptive capacity after the below indicated number of hours on stream in the fluidized bed are noted below in Table III. The attrition resistance (on unit) is also noted for both the unsupported and supported sorbents below in Table III.

TABLE III

| Sorbent | On unit attrition resistance[1] | Sorptive capacity for butadiene sorption[2] | |
|---|---|---|---|
| | | Fresh sorbent | After— hours- cycles, |
| (A) "Nalcat" silica-Alumina supported CuCl containing 42.8 weight percent CuCl | 0.8 | 84 | 77 (118–54) |
| (B) Unsupported CuCl | 0.6 | 74 | 56 (114–68) |

[1] Percent fines lost/days.
[2] Percent of theoretical, based on CuCl content.

As noted from the on-unit attrition resistance data in Table III above, the attrition resistance of the supported sorbent is somewhat less than that of the unsupported sorbent. However, the sorptive capacity of the supported sorbent is not adversely affected thereby. The attrition resistance of the supported sorbents can be improved by coating the supported complex with a polymer film before decomplexing and then heating at temperatures below 200° F. to activate the sorbent and cure the polymeric film simultaneously as noted in the example below.

EXAMPLE 7

The "Nalcat" microspheres of Example 1 are impregnated thrice with the cuprous chloride solution as in Example 2, except that the last impregnated cuprous chloride-butadiene complex (formed in situ within the pores of the porous "Nalcat" support) is not activated as per the two preceding impregnation steps.

Instead the impregnated "Nalcat" microspheres are coated with a polyurethane lacquer solution containing six grams of polyurethane lacquer (linseed oil modified with tolylene diisocyanate) dissolved in 200 grams of n-pentane. The coating operation is conducted by slurrying the impregnated "Nalcat" microspheres in the polyurethane lacquer solution. Then the solvent is evaporated and the coated supported sorbent is heated at a temperature of 140° F. in a vacuum oven (26 inches of Hg vacuum) to simultaneously activate the cuprous chloride-butadiene complex (from the third impregnation) and cure the polymer film. This simultaneous activation-curing produces communicating pores in the polymeric film, viz, film pores communicating with the pores of the support and/or active sorbent along common axes of porosity. The resistance to attrition of the coated, supported active cuprous halide as produced herein is better than that of the supported but uncoated active cuprous halide sorbents of Example 6 without any noticeable loss of advantageous properties (sorptive capacity, useful life, etc.) in comparison therewith.

While the above examples disclose the use of liquid butadiene as a complexing agent to form the cuprous chloride-ligand complex within the pores of the inorganic particulate support, it should be noted that gaseous butadiene, although less preferably employed, can be used in place of liquid butadiene. Moreover, it should be noted that the inorganic particulate support can be precoated with an unsaturated, halogenated or unhalogenated silane to provide a moisture shield thereon prior to impregnation with either the cuprous chloride solution or the complexing agent. Usually, however, such a moisture shield is not necessary. Hence it is preferred to operate without the silane moisture shield.

Moreover, as noted in Example 7, the attrition resistance of the supported cuprous halide sorbents can be enhanced by application of a polymeric coating thereto. While Example 7 illustrates the use of a polyurethane coating other polymeric films can be applied. Any organic polymer film can be used provided it has the following characteristics: (1) the coating must be sufficiently porous to permit sorption-desorption to be conducted readily;

(2) the coating must enhance the attrition resistance of the sorbent particles so that the coated sorbent has an attrition resistance greater than that of the uncoated cuprous halide sorbent particles; (3) the coating material should solidify to form a tough, durable, self-supporting film at temperatures below approximately 200° F., to avoid thermal damage to the active cuprous halide particles; (4) the porosity of the coating must be sufficient to permit passage of the complexing ligands, such as butadiene, which complex with the sorbents; but must be sufficiently low to prevent egress of cuprous halide sorbent particles or subparticles whose size is normally less than 40 microns. Usually the average pore size of pores in the polymeric film is less than 20 microns and preferably less than 10 microns; (5) the coating material in the uncured (solution or dispersion) stage, must be soluble or readily dispersible in a solvent and/or dispersing carrier which is chemically inert to and does not deleteriously affect the cuprous halide sorbent particles; (6) the polymeric film when cured should have an average film thickness ranging from about 10–600 A., usually from about 20–400 A., and preferably from about 40–200 A.; and (7) the polymeric film in the cured state must be chemically inert to (free from attack by) light hydrocarbons present in the feedstock also containing the olefin or diolefin to be sorbed. The coated supported cuprous halide sorbents contain as a surface coating from about ½ to about 30 wt. percent of the polymeric film (based on the weight of the cuprous halide sorbent), usually from 1.5 to 20 wt. percent, and preferably about 3 to 10 wt. percent. The specific preferred wt. percent of deposited film will vary depending upon the specific polymer used to form the film.

A wide variety of organic polymers can be employed to form the polymeric films which can be employed in accordance with the supported cuprous halide sorbents of this invention. Exemplary organic polymers which can be used include, but are not limited to, the following: polybutadiene homopolymers and copolymers, e.g., polybutadiene, oxidized polybutadienes, hydroformylated polybutadienes, etc., having a molecular weight (number average) ranging from 500 to 6000 and copolymers of butadiene with other polymerizable monomers, e.g. styrene, acrylonitrile, leading to the formation of solvent-soluble copolymers capable of curing at the temperature below 200° F. with or without extraneous curing agents (i.e., extraneous to the polymer) such as butadiene-styrene, butadiene-acrylonitrile, etc.; polyurethane polymers, such as those formed by the reaction of various aromatic diisocyanates, e.g., tolylene diisocyanate, bitolylene diisocyanate, diphenyl methane diisocyanate, etc., with hydroxyl group containing materials, e.g. modified linseed oil, castor oil, polyols, polyesters and polyethers which can contain an amine, lead naphthenate or cobalt naphthenate or other suitable curing agent in minor amounts; silicone polymers such as mono or polyalkyl silicone and siloxane resins, including those formed in situ using polymerizable, e.g., unsaturated halosilenes or readily polymerizable silanols; alkyd resins, such as the condensation product of a polyol, an acid anhydride, and a fatty acid; epoxy resins, such as the condensation products of epihalohydrins, e.g., epichlorhydrin, with a dihydric phenol; polyester resins, including the condensation products of polybasic saturated or unsaturated organic acids or anhydrides thereof, e.g., fumaric acid, maleic anhydride, phthalic anhydride, isophthalic acid, adipic acid, azelaic acid, etc., with saturated or unsaturated polyhydroxy alcohols, e.g., ethylene glycol, propylene glycol, 1,3-butylene glycol, 2,3-butylene glycol, diethylene glycol, dipropylene glycol, etc.; various high molecular weight cellulose and nitro cellulose polymers, e.g., cellulose and nitrocellulose polymers having molecular weights between about 10,000 to 300,000; and other film forming polymers that cure at low temperatures, i.e., <200° F. Various mixtures of any two or more of the abovementioned polymers dissolved or dispersed in a common solvent or dispersion medium can likewise be employed.

The specific solvent and/or dispersion medium employed to dissolve the curable polymer will depend upon the particular polymer coating being deposited. For example, suitable solvents for polybutadienes, butadiene-styrene and butadiene-acrylonitrile copolymers and/or terpolymers, polyurethane polymers, silicone polymers, epoxy polymers, and polyester polymers include, but are not limited to, the following: $C_4$ to $C_{10}$ n-alkanes, e.g., n-butane, n-pentane, n-hexane, n-heptane, n-octane, n-nonane, n-decane; $C_2$ to $C_{12}$ di-lower alkyl ketones, i.e., dialkyl ketones in which each alkyl constituent has from 1 to 6 carbon atoms, e.g., acetone, methyl isobutyl ketone, diethyl ketone, methyl ethyl ketone, etc. In addition to solvent carriers, the polymers can be dispersed in aqueous or non-aqueous dispersion mediums.

The concentration of polymer dissolved and/or dispersed in the solvent and/or dispersion medium can range from about 0.5 to 50 wt. percent (based on total polymer solution or dispersion), usually ranges from about 1 to 40 wt. percent and preferably ranges from about 2 to 25 wt. percent. These coating solutions can contain dissolved or dispersed therein varying amounts of curing agents which are capable of curing the polymer contained in the solution and/or dispersion at temperatures below about 200° F. Suitable exemplary curing (cross-linking) agents which can be employed include, but are not limited to, the following: organic diisocyanates, e.g., tolylene diisocyanate; organic and inorganic peroxides and hydroperoxides, e.g. benzoyl peroxide, di-tert-butyl peroxide, cumene hydroperoxide, sodium peroxide; difunctional aromatics, e.g. divinyl benzene; alkylene mono or polyamines, e.g., ethylene diamine, hexamethylene diamine, hexamethylene pentamine, etc. The specific curing agent employed will vary according to the type of polymer employed in the coating formulation. While varying amounts of curing agent can be present, generally the concentration of curing agent in the solution and/or dispersion based on polymer content ranges from about 0.1 to 5.0 wt. percent, and more usually from 0.1 to 1.0 wt. percent.

What is claimed is:

1. A process for preparing improved cuprous halide sorbents which comprises impregnating a cuprous halide solution into a porous particulate silica and/or alumina containing inorganic support having a surface area less than about 350 m.$^2$/gram, a high pore volume of at least about 1 cc./gram, an average pore diameter of >100 A., but <about 10,000 A. and a predominant component (wt. basis) having a particle size ranging from 30 to 200 microns;

forming an insoluble cuprous halide-ligand complex in situ within the pores of said support by contacting said impregnated support with a complexing agent capable of forming a stable copper complex having a mole ratio of copper to complexing agent of >1:1; and then decomplexing said cuprous halide-ligand complex to activate said cuprous halide in situ within said pores of said support to yield an active supported cuprous halide sorbent.

2. A process as in claim 1 wherein said active sorbent is formed in situ within the pores of said porous support by a plurality of impregnation steps.

3. A process as in claim 1 wherein said cuprous halide is cuprous chloride.

4. A process as in claim 1 wherein the solvent in said cuprous halide solution is a $C_4$ to $C_9$ olefinic hydrocarbon in which said cuprous halide-ligand complex is insoluble.

5. A process as in claim 1 wherein said complexing agent is one capable of forming a stable copper complex having a copper to complexing moiety mole ratio of approximately 2:1 and higher.

6. A process as in claim 5 wherein said complexing agent is butadiene.

7. A process for preparing an improved cuprous chloride sorbent which comprises impregnating a $C_4$-$C_9$ olefinic hydrocarbon solution of cuprous chloride into a inorganic, porous, particulate support containing a component material selected from the group consisting of: silica, alumina, and mixtures of silica and alumina, and having a surface area less than about 350 m.$^2$/gram, a high pore volume of 1.5+ cc./gram, an average pore diameter of >200 A. but <about 8000 A. and 50+ wt. percent of the particulate support having a particle size ranging from 50 to 200 microns;

forming an insoluble cuprous chloride-butadiene complex in situ within the pores of said support by contacting said cuprous chloride impregnated support with liquid butadiene at temperatures of −15 to 15° F.; and then decomplexing said cuprous chloride-ligand complex to form and activate said cuprous chloride solvent in situ within said pores of said support to yield an active supported cuprous chloride sorbent.

8. A process as in claim 7 wherein said decomplexing step is conducted by heating said cuprous chloride-butadiene supported complex at temperatures ranging from about 60 to 200° F.

9. A process as in claim 7 wherein the total amount of active cuprous chloride sorbent is formed in situ within said porous support by a plurality of impregnation, complexing and decomplexing steps.

10. A process as in claim 9 wherein the concentration of said cuprous chloride sorbent formed on said porous support ranges from 30 to 90 wt. percent based on support plus srobent.

11. A process as in claim 7 which includes applying to said supported complex particles a polymeric coating vehicle containing an organic polymer curable at a temperature below about 200° F. and then simultaneous curing said coating and decomplexing said particles by heating said coated, supported complex at temperatures ranging from about 100 to 180° F. to form a porously filmed, supported active cuprous chloride sorbent wherein the pores of said film communicate with the pores of said supported sorbent along common axes of porosity.

12. A supported, active, readily fluidizable cuprous halide sorbent comprising a porous, particulate inorganic support containing a component material selected from the group consisting of: silica, alumina, and mixtures of silica and alumina, and active cuprous halide particles having an average crystallite size ranging from about 350 to 650 A. located within the pores thereof and a porosity of at least 10 percent (of the total volume of a particle) 550 to 10,000 A. pores, said supported active cuprous halide sorbent particles having: a surface area of less than 150 m.$^2$/gram; a cuprous halide content of at least about 30 wt. percent, based on the total of support plus sorbent; and having 50+ wt. percent of the particles ranging in size from 30 to 200 microns.

13. A supported cuprous halide sorbent as in claim 12 wherein said cuprous halide is cuprous chloride.

14. A supported cuprous halide sorbent as in claim 12 wherein said cuprous halide content ranges from about 30 to 90 wt. percent.

15. A supported cuprous halide sorbent in claim 12 containing as an exterior coating on said particles a porous polymeric film wherein the pores of said film communicate with the pores of said supported sorbent along common axes of porosity.

16. A supported, active, readily fluidizable cuprous chloride sorbent comprising a porous, particulate inorganic support containing a component material selected from the group consisting of: silica, alumina and mixtures of silica and alumina, and active cuprous chloride particles having an average crystallite size ranging from 400 to 600 A. and a porosity of at least 10 percent (of the total volume of a particle) 550 to 10,000 A. pores, located within the pores of said support, said supported active cuprous chloride sorbent particles being characterized by:

a surface area of less than 150 m.$^2$/gram;

a cuprous chloride content of about 30 to 90 wt. percent, based on the total of support plus sorbent;

70+ wt. percent of the particles ranging in size from 50 to 200 microns; and a durable sorptive capacity for selective butadiene sorption of at least about 30% of theoretical based on cuprous chloride content.

17. A supported sorbent as in claim 16 containing as an external coating on said particles a porous polymeric film wherein the pores of said film communicate with the pores of said supported sorbent along common axes of porosity.

References Cited

UNITED STATES PATENTS

| | | | |
|---|---|---|---|
| 2,446,076 | 7/1948 | Campbell et al. | 23—2X |
| 3,340,827 | 3/1966 | Laine et al. | 252—441X |
| 3,340,004 | 9/1967 | Hunter et al. | 23—97 |

EARL C. THOMAS, Primary Examiner

O. R. VERTEZ, Assistant Examiner